United States Patent
Binek et al.

(10) Patent No.: US 10,702,939 B2
(45) Date of Patent: Jul. 7, 2020

(54) COLD-SPRAY BRAZE MATERIAL DEPOSITION

(71) Applicant: Hamilton Sundstrand Corporation, Charlotte, NC (US)

(72) Inventors: Lawrence Binek, Glastonbury, CT (US); Aaron T. Nardi, East Granby, CT (US); John A. Ferro, Hartland, CT (US); Matthew William Miller, Enfield, CT (US); Raffi O. Mangoyan, Manchester, CT (US); Timothy E. Mandel, Jr., New Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 76 days.

(21) Appl. No.: 15/945,855

(22) Filed: Apr. 5, 2018

(65) Prior Publication Data
US 2019/0308266 A1    Oct. 10, 2019

(51) Int. Cl.
*B23K 1/00*    (2006.01)
*B23K 3/06*    (2006.01)
(Continued)

(52) U.S. Cl.
CPC .......... *B23K 3/0607* (2013.01); *B23K 1/0012* (2013.01); *B23K 35/0222* (2013.01);
(Continued)

(58) Field of Classification Search
CPC .............. B23K 3/0607; B23K 35/0222; B23K 35/304; B23K 35/3033; B23K 35/0244; B23K 1/0012; B23K 3/06; B23K 3/0623; B23K 1/00–206; B23K 3/0638; B23K 35/025; C23C 24/10; C23C 24/082;
(Continued)

(56) References Cited

U.S. PATENT DOCUMENTS

| 7,360,678 B2 * | 4/2008 | Pietruska | B23P 6/007 228/119 |
| 7,367,488 B2 * | 5/2008 | Payne | B23P 6/007 228/119 |

(Continued)

FOREIGN PATENT DOCUMENTS

| CN | 102766378 A * | 7/2012 | |
| EP | 2219004 A2 * | 8/2010 | F28F 9/0217 |

(Continued)

OTHER PUBLICATIONS

Machine translation of CN102766378A (no date available).*
(Continued)

*Primary Examiner* — Kiley S Stoner
(74) *Attorney, Agent, or Firm* — Cantor Colburn LLP

(57) ABSTRACT

Aspects include supplying a plurality of nickel-enriched braze powder particles to a cold spray system through a particle supply inlet. The nickel-enriched braze powder particles are accelerated through a transfer tube and out an exit in the transfer tube towards a substrate to produce a braze cold-sprayed substrate. A component surface is positioned proximate to the braze cold-sprayed substrate. The braze cold-sprayed substrate is heated to bond the braze cold-sprayed substrate to the component surface.

13 Claims, 4 Drawing Sheets

(51) Int. Cl.
*B23K 35/02* (2006.01)
*B23K 35/30* (2006.01)
*C23C 24/04* (2006.01)
*C23C 24/08* (2006.01)
*C23C 24/10* (2006.01)

(52) U.S. Cl.
CPC ........ *B23K 35/0244* (2013.01); *B23K 35/304* (2013.01); *B23K 35/3033* (2013.01); *C23C 24/04* (2013.01); *C23C 24/08* (2013.01); *C23C 24/082* (2013.01); *C23C 24/087* (2013.01); *C23C 24/10* (2013.01); *C23C 24/106* (2013.01)

(58) Field of Classification Search
CPC ..... C23C 24/106; C23C 24/08; C23C 24/087; C23C 24/04
USPC .......................... 228/245–262, 262.3–262.31
See application file for complete search history.

(56) References Cited

U.S. PATENT DOCUMENTS

| | | | | |
|---|---|---|---|---|
| 7,624,910 B2* | 12/2009 | Barnes | ................... | C08J 9/0023 228/248.1 |
| 7,997,472 B2* | 8/2011 | Szymanski | .......... | B23K 20/122 228/112.1 |
| 8,448,839 B1* | 5/2013 | Rakozy | .............. | B23K 35/3006 228/135 |
| 8,505,806 B2* | 8/2013 | Totino | .................... | B23K 9/124 228/227 |
| 9,548,518 B2* | 1/2017 | Kumar | ..................... | B23K 1/19 |
| 9,682,445 B1* | 6/2017 | Chou | ..................... | B23K 20/02 |
| 9,969,654 B2* | 5/2018 | Fisk | ...................... | B23K 20/02 |
| 9,995,154 B2* | 6/2018 | Burghardt | ............. | F01D 5/3061 |
| 10,174,412 B2* | 1/2019 | Lin | ......................... | F01D 5/288 |
| 10,252,371 B2* | 4/2019 | Chou | ..................... | B23K 20/10 |
| 10,357,941 B2* | 7/2019 | Li | ............................ | B32B 27/08 |
| 2007/0031591 A1* | 2/2007 | Junker | ..................... | C23C 24/04 427/140 |
| 2007/0098912 A1 | 5/2007 | Raybould et al. | | |
| 2008/0160332 A1 | 7/2008 | Dighe et al. | | |
| 2010/0108776 A1 | 5/2010 | Esfahani et al. | | |
| 2010/0206532 A1 | 8/2010 | Alahyari et al. | | |
| 2015/0197858 A1 | 7/2015 | Corbeil et al. | | |
| 2016/0014929 A1 | 1/2016 | Jaworowski et al. | | |
| 2016/0172713 A1* | 6/2016 | Kumar | ..................... | B23K 1/19 228/124.5 |
| 2016/0237573 A1 | 8/2016 | Nardi et al. | | |
| 2016/0325369 A1 | 11/2016 | Prociw et al. | | |
| 2017/0205156 A1 | 7/2017 | Ranjan et al. | | |
| 2018/0355487 A1* | 12/2018 | Hirano | ............... | B23K 35/3033 |

FOREIGN PATENT DOCUMENTS

| | | | | |
|---|---|---|---|---|
| JP | 2008231486 | | 10/2008 | |
| JP | 2008231486 A | * | 10/2008 | |
| JP | 2013220427 | | 10/2013 | |
| JP | 2015094016 | | 5/2015 | |
| KR | 100847131 | | 7/2008 | |
| WO | WO-2008098336 A1 | * | 8/2008 | ............. C23C 24/04 |
| WO | WO-2015061164 A1 | * | 4/2015 | |
| WO | WO-2016185996 A1 | * | 11/2016 | ............... B23K 1/20 |

OTHER PUBLICATIONS

Machine translation of JP2008231486A (no date available).*
EP Application No. 19167666.7 Extended EP Search Report dated May 28, 2019.

* cited by examiner

COLD-SPRAY BRAZE MATERIAL DEPOSITION

BACKGROUND

Embodiments of the present disclosure relate to cold spray systems, and more particularly, to cold-spray braze material deposition.

To join materials in a manufacturing process, braze material can be applied as a braze paste manually released from a braze alloy tube through a nozzle by an applicator using a syringe-type dispenser. Braze material application is a lengthy, labor driven process. In assemblies with large amounts of braze interfaces, labor efforts are driven up, and there is an increased risk of ergonomic-related injuries. The amount of braze deposited to an interface is subject to the experience and skill level of the applicator and therefore there is a degree of variation with respect to consistency of results.

BRIEF DESCRIPTION

Disclosed is a method that includes supplying a plurality of nickel-enriched braze powder particles to a cold spray system through a particle supply inlet. The nickel-enriched braze powder particles are accelerated through a transfer tube and out an exit in the transfer tube towards a substrate to produce a braze cold-sprayed substrate. A component surface is positioned proximate to the braze cold-sprayed substrate. The braze cold-sprayed substrate is heated to bond the braze cold-sprayed substrate to the component surface.

In addition to one or more of the features described above, or as an alternative to any of the foregoing embodiments, further embodiments may include where the nickel-enriched braze powder particles includes a braze alloy powder combined with a fine nickel powder.

In addition to one or more of the features described above, or as an alternative to any of the foregoing embodiments, further embodiments may include where the substrate includes a nickel-based alloy.

In addition to one or more of the features described above, or as an alternative to any of the foregoing embodiments, further embodiments may include forming a hole in the braze cold-sprayed substrate and positioning the component surface within the hole.

In addition to one or more of the features described above, or as an alternative to any of the foregoing embodiments, further embodiments may include where the braze cold-sprayed substrate includes a manifold of a tube-shell heat exchanger and the component surface comprises an exterior of a tube.

In addition to one or more of the features described above, or as an alternative to any of the foregoing embodiments, further embodiments may include cold spraying a plurality of surfaces of the substrate, forming a plurality of holes in each cold-sprayed surface of the braze cold-sprayed substrate of the manifold, and positioning a tube end in each of the holes prior to heating.

In addition to one or more of the features described above, or as an alternative to any of the foregoing embodiments, further embodiments may include determining a plurality of target locations of the holes prior to forming the holes, and limiting the cold spraying to localized areas proximate to the target locations.

Also disclosed is a method that includes combining a fine nickel powder with a braze alloy powder to form a nickel-enriched braze powder, processing the nickel-enriched braze powder to deform a plurality of finer particles and produce a plurality of nickel-enriched braze powder particles, supplying the nickel-enriched braze powder particles to a cold spray system, and accelerating the nickel-enriched braze powder particles in the cold spray system towards a substrate to produce a braze cold-sprayed substrate.

In addition to one or more of the features described above, or as an alternative to any of the foregoing embodiments, further embodiments may include where processing the nickel-enriched braze powder includes mixing the nickel-enriched braze powder with an acid and a polymer.

In addition to one or more of the features described above, or as an alternative to any of the foregoing embodiments, further embodiments may include applying a magnetic field to the braze alloy powder to remove a quantity of nickel from the braze alloy powder prior to combining the fine nickel powder with the braze alloy powder.

In addition to one or more of the features described above, or as an alternative to any of the foregoing embodiments, further embodiments may include controlling a velocity of a gas stream used to accelerate the nickel-enriched braze powder particles.

In addition to one or more of the features described above, or as an alternative to any of the foregoing embodiments, further embodiments may include controlling a temperature of one or more of: the nickel-enriched braze powder particles and the gas stream.

In addition to one or more of the features described above, or as an alternative to any of the foregoing embodiments, further embodiments may include controlling one or more of: a position of the substrate and a position of a spray nozzle operable to accelerate the nickel-enriched braze powder particles towards the substrate.

In addition to one or more of the features described above, or as an alternative to any of the foregoing embodiments, further embodiments may include where the cold spray system includes an enclosure and the method further includes recapturing a volume of gas from the gas stream within the enclosure.

Also disclosed is a system that includes a particle supply inlet in fluid communication with a particle supply source of a plurality of nickel-enriched braze powder particles, an accelerator gas inlet in fluid communication with an accelerator gas source, a transfer tube in fluid communication with the particle supply inlet and the accelerator gas inlet, and a controller operable to supply the nickel-enriched braze powder particles through a particle supply inlet and accelerate the nickel-enriched braze powder particles through the transfer tube and out the exit of the transfer tube towards a substrate to produce a braze cold-sprayed substrate.

In addition to one or more of the features described above, or as an alternative to any of the foregoing embodiments, further embodiments may include where the controller is operable to control a velocity of a gas stream used to accelerate the nickel-enriched braze powder particles.

In addition to one or more of the features described above, or as an alternative to any of the foregoing embodiments, further embodiments may include where the controller is operable to control a temperature of one or more of: the nickel-enriched braze powder particles and the gas stream.

In addition to one or more of the features described above, or as an alternative to any of the foregoing embodiments, further embodiments may include where the controller is operable to adjust a position of the exit with respect to the substrate.

In addition to one or more of the features described above, or as an alternative to any of the foregoing embodiments, further embodiments may include an enclosure and a gas reclamation system operable to recapture a volume of gas released from the accelerator gas source within the enclosure.

A technical effect of methods and systems is achieved by cold-spray braze material deposition.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the Figures.

Through a combination of cold spray technology and braze-deposition material, a brazed interface can be applied to a substrate for joining a component surface in a manufacturing process of an apparatus. In some embodiments, motion and/or flow controls can be used to establish complex spray path plans resulting in a substantially even deposition of braze material.

Figure 1:
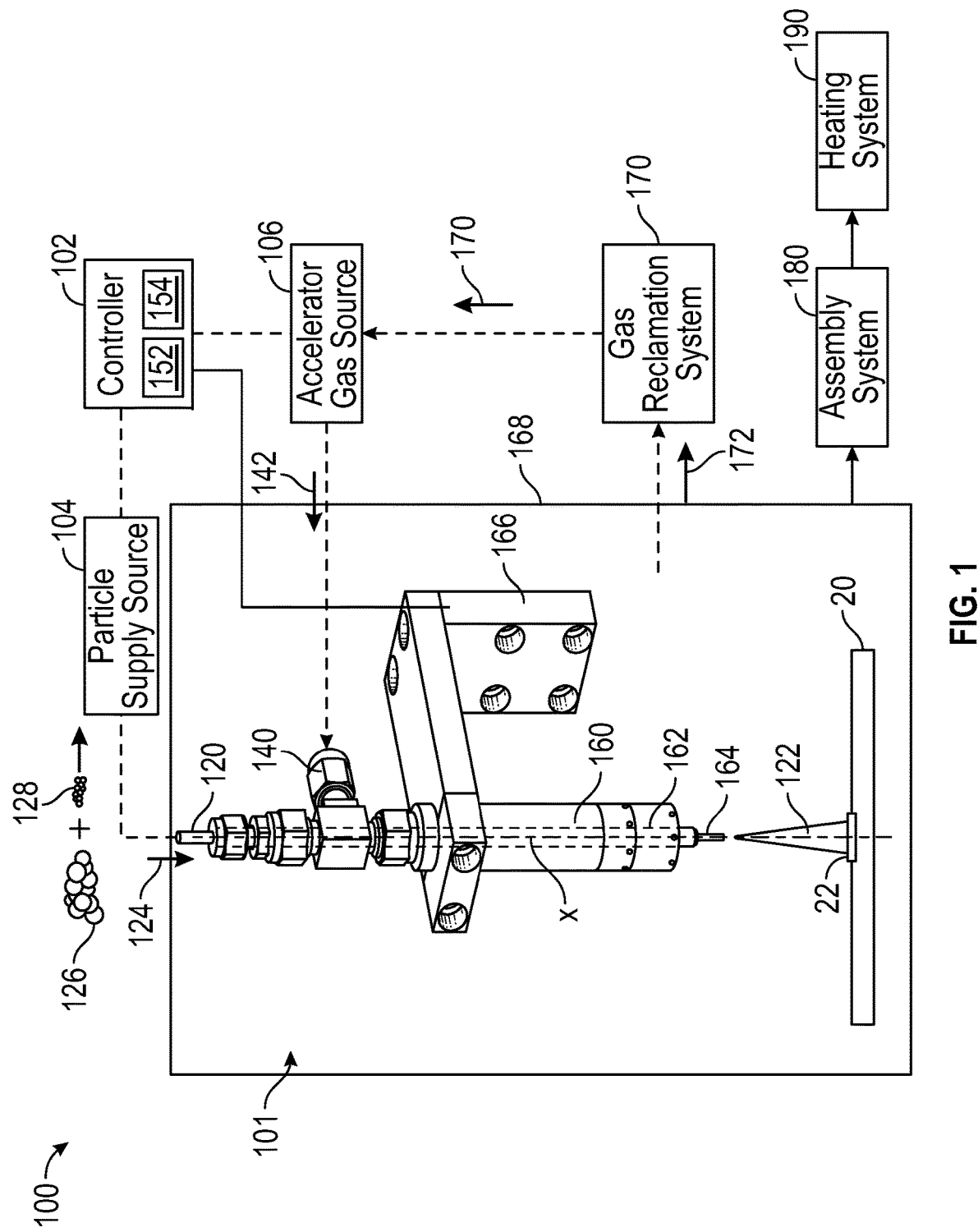
FIG. 1 is a schematic view of a cold spray system for braze material deposition in accordance with an embodiment of the disclosure.

As seen in FIG. 1, a system 100 includes a cold spray system 101 with a controller 102, a particle supply source 104, an accelerator gas source 106, and a housing 160. The housing 160 includes a particle supply inlet 120, an accelerator gas inlet 140, and a longitudinal axis X. The housing 160 also includes a transfer tube 162 oriented parallel and coaxial to the longitudinal axis X. As may be appreciated by one of skill in the art, the transfer tube 162 may be various shapes and dimensions to achieve a desired flow of nickel-enriched braze powder particles 122 out of an exit 164 of the transfer tube 162. The transfer tube 162 is in fluid communication with the particle supply inlet 120 and the accelerator gas inlet 140. A carrier flow 124 may include both a gas and powder that compose the nickel-enriched braze powder particles 122 applied as a braze material coating 22 on the substrate 20. The carrier flow 124 may include one or more powder sources and transport mechanisms (i.e., screw auger, mechanical agitation) controlled responsive to the controller 102 to urge the nickel-enriched braze powder particles 122 into the particle supply inlet 120.

The transfer tube 162 is configured to receive a gas stream 142 from the accelerator gas source 106. The accelerator gas source 106 can be, for example, helium, nitrogen, or another suitable gas. The controller 102 selectively controls the release pressure of the gas stream 142 to accelerate the nickel-enriched braze powder particles 122 to supersonic speeds. Upon impact with the substrate 20, rapid plastic deformation creates a bond to the substrate 20 without melting. In some embodiments, the nickel-enriched braze powder particles 122 and/or the gas stream 142 can be heated. Heating the nickel-enriched braze powder particles 122 and not the substrate 20 may soften the nickel-enriched braze powder particles 122 and improve adhesion without damaging the substrate 20.

The controller 102 can interface with and control multiple elements of the system 100, such as positions, flow rates, pressures, temperatures, and the like. In an embodiment, the controller 102 includes a memory system 152 to store instructions that are executed by a processing system 154 of the controller 102. The executable instructions may be stored or organized in any manner and at any level of abstraction, such as in connection with a controlling and/or monitoring operation of the system 100. The processing system 154 can include one or more processors that can be any type of central processing unit (CPU), including a microprocessor, a digital signal processor (DSP), a microcontroller, an application specific integrated circuit (ASIC), a field programmable gate array (FPGA), or the like. Also, in embodiments, the memory system 152 may include random access memory (RAM), read only memory (ROM), or other electronic, optical, magnetic, or any other computer readable medium onto which is stored data and control algorithms in a non-transitory form.

One or more portions of the cold spray system 101 can be controlled to adjust a position of the exit 164 with respect to the substrate 20. For example, a support structure 166 of the cold spray system 101 can be an articulating arm or other movable structure (e.g., a robotic arm) controlled responsive to the controller 102. Movement of the substrate 20 can also or alternatively be controlled by the controller 102. Motion controls in combination with temperature/pressure controls can produce the braze material coating 22 with a desired thickness at a desired location.

In embodiments, the nickel-enriched braze powder particles 122 can be formed from a braze alloy powder 126 combined with a fine nickel powder 128. As one example, a ratio of the braze alloy powder 126 to the fine nickel powder 128 can be about 4:1. As one example, the braze alloy powder 126 can be AMS4782 (BNi-5). The fine nickel powder 128 is characterized as having a size that is equal to or larger than the size of the braze alloy powder 126 when simple blending is performed to combine with the braze alloy powder 126. The fine nickel powder 128 when combined with the braze alloy powder 126 through granulation, or other methods of bonding powders together may be roughly one order of magnitude finer than the braze alloy powder 126 and can be bonded to the braze alloy power 126 using organic binders or mechanical deformation, or some combination of methods. As an example, for braze powders that may be 20-45 microns as the braze alloy power 126, embodiments may use 2-8 micron nickel powder as the fine nickel powder 128. The substrate 20 can be a nickel-based alloy and may also include chromium, cobalt, molybdenum, titanium, aluminum, iron, manganese, and/or trace amounts of other materials. One example of such an alloy is HAYNES® 282® alloy. Other alloys are also contemplated. The addition of the fine nickel powder 128 can enhance adhesion of the braze alloy powder 126 with respect to the substrate 20. In some embodiments, a quantity of nickel is removed from the braze alloy powder 126 prior to combining the fine nickel powder 128 with the braze alloy powder 126 to reduce the chemistry balance change in the braze alloy powder 126 after processing into the nickel-enriched braze powder particles 122. Thus, the term "nickel-enriched" can include the addition of the fine nickel powder 128 to the braze alloy powder 126 after nickel depletion of the braze alloy powder 126, or the fine nickel powder 128 can be added to the braze alloy powder 126 absent a step of removing a quantity of nickel from the braze alloy powder 126.

In some embodiments, the cold spray system 101 includes an enclosure 168 to trap gas released from the accelerator gas source 106. The system 100 can include a gas reclamation system 170 operable to recapture a volume of gas released from the accelerator gas source 106 within the enclosure 168. The gas reclamation system 170 can filter a flow of reclaimed gas 172 to remove particulates, perform gas separation using a gas separator to increase the gas, and return cleaned concentrated gas 174 back to the accelerator gas source 106.

After applying the braze material coating 22 on the substrate 20, an assembly subsystem 180 can position a component surface proximate to the substrate 20 as an automated, manual, or semi-automated process. A resulting assembly of the of the assembly subsystem 180 can be heated by a heating system 190 to bond the braze material coating 22 with the substrate 20 and the component surface proximate to the substrate 20, for instance, as a reflow process. The heating system 190 can be, for example, a furnace.

Figure 2:
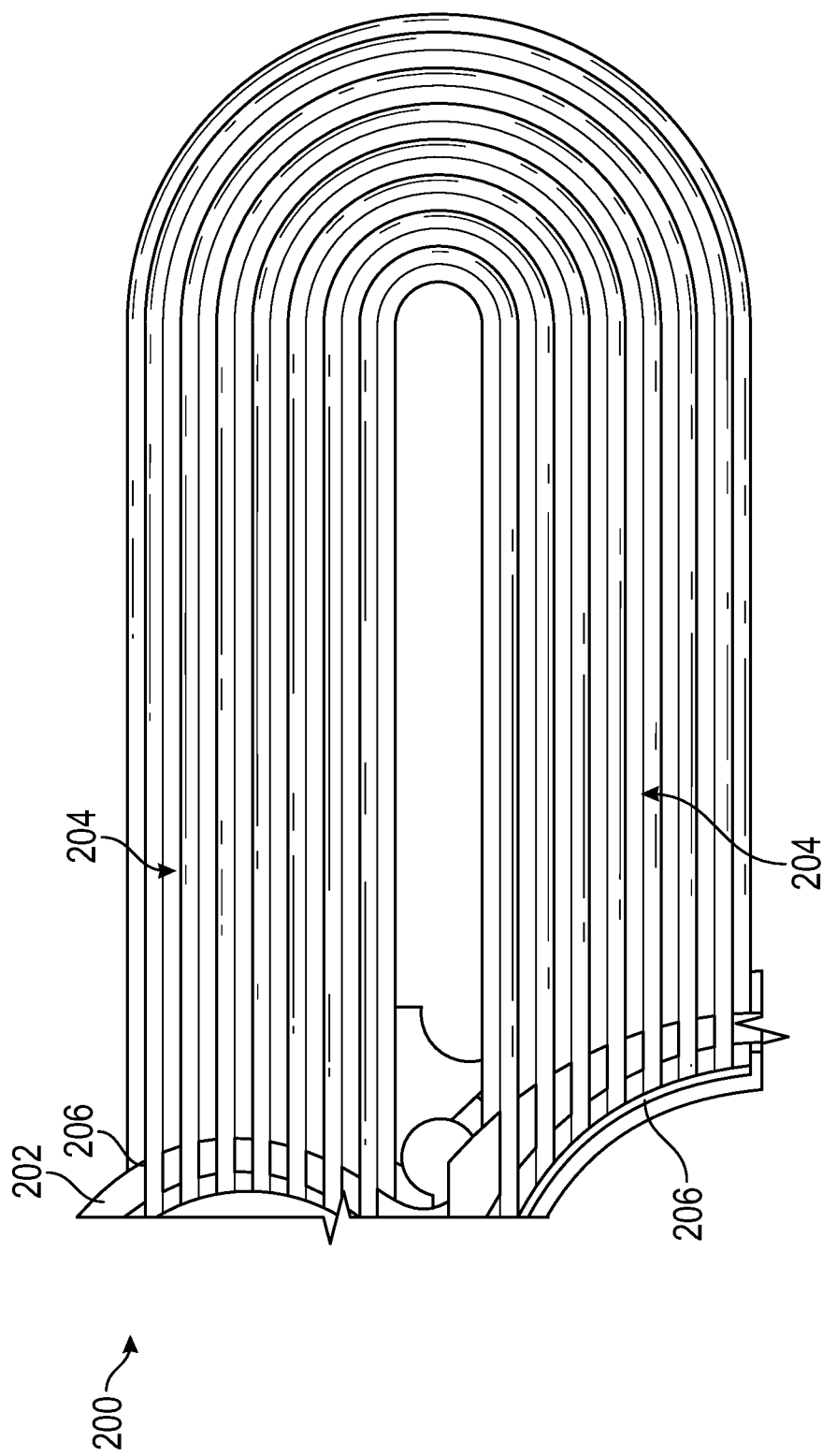
FIG. 2 is a partial perspective view of an apparatus assembled in accordance with an embodiment of the disclosure.

FIG. 2 is a partial perspective view of an apparatus 200 assembled in accordance with embodiments of the disclosure. The apparatus 200 is an example of a tube-shell heat exchanger, where a manifold 202 is an example of the substrate 20 of FIG. 1 bonded with a plurality of tubes 204 at one or more surfaces 206.

Figure 3:
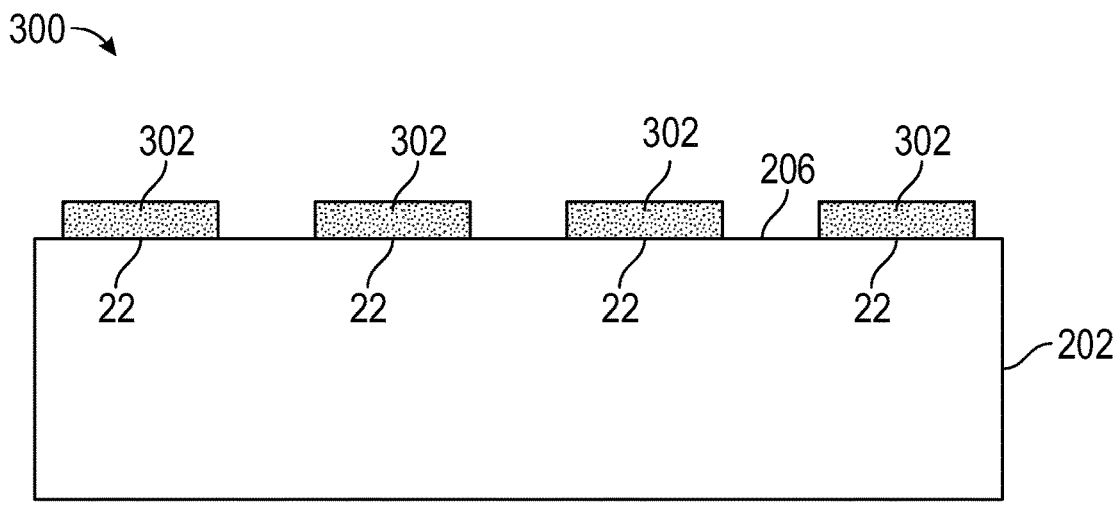
FIG. 3 is a partial end view of a braze cold-sprayed substrate in accordance with an embodiment of the disclosure.

FIG. 3 is a partial end view of a braze cold-sprayed substrate 300 in accordance with embodiments of the disclosure. Using the system 100 of FIG. 1, the braze material coating 22 can be cold sprayed on to a surface 206 of the manifold 202 with a desired thickness at target locations 302. The target locations 302 can comprise a large area or substantially all of surface 206. In some embodiments, the controller 102 of FIG. 1 limits the cold spraying to localized areas proximate to the target locations 302.

Figure 4:
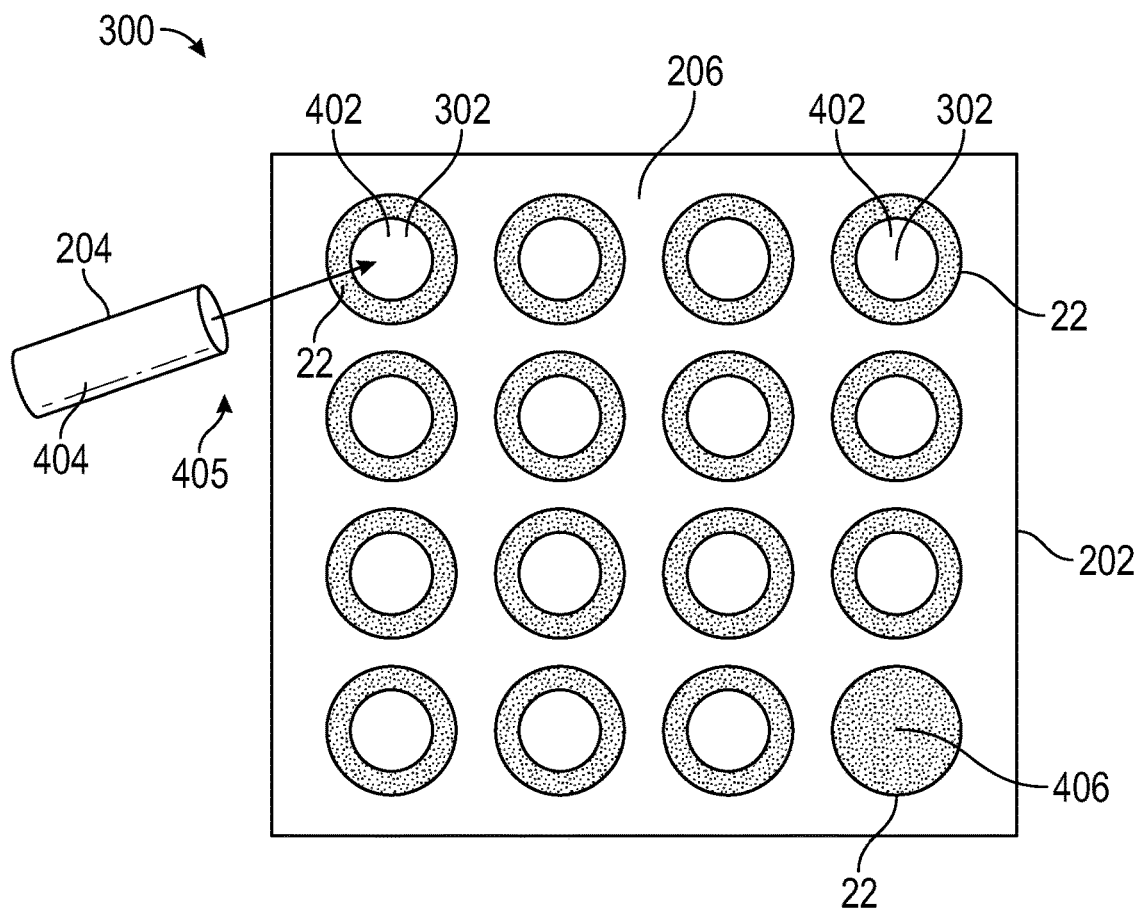
FIG. 4 is a partial side view of a braze cold-sprayed substrate in accordance with an embodiment of the disclosure.

FIG. 4 is a partial side view of the braze cold-sprayed substrate 300 in accordance with embodiments of the disclosure. A plurality of holes 402 can be formed in each cold-sprayed surface 206 of the braze cold-sprayed substrate 300 of the manifold 202 (e.g., on different sides of the manifold 202 as depicted in FIG. 2). The holes 402 can be formed at the target locations 302, where a diameter of the braze material coating 22 extends beyond a diameter of each hole 402 such that a remaining amount of the braze material coating 22 is retained to bond with a component surface 404 of each corresponding tube 204. In some embodiments, each surface 206 of the manifold 202 is initially marked with the target locations 302 prior to cold spraying and/or forming the holes 402.

Figure 5:
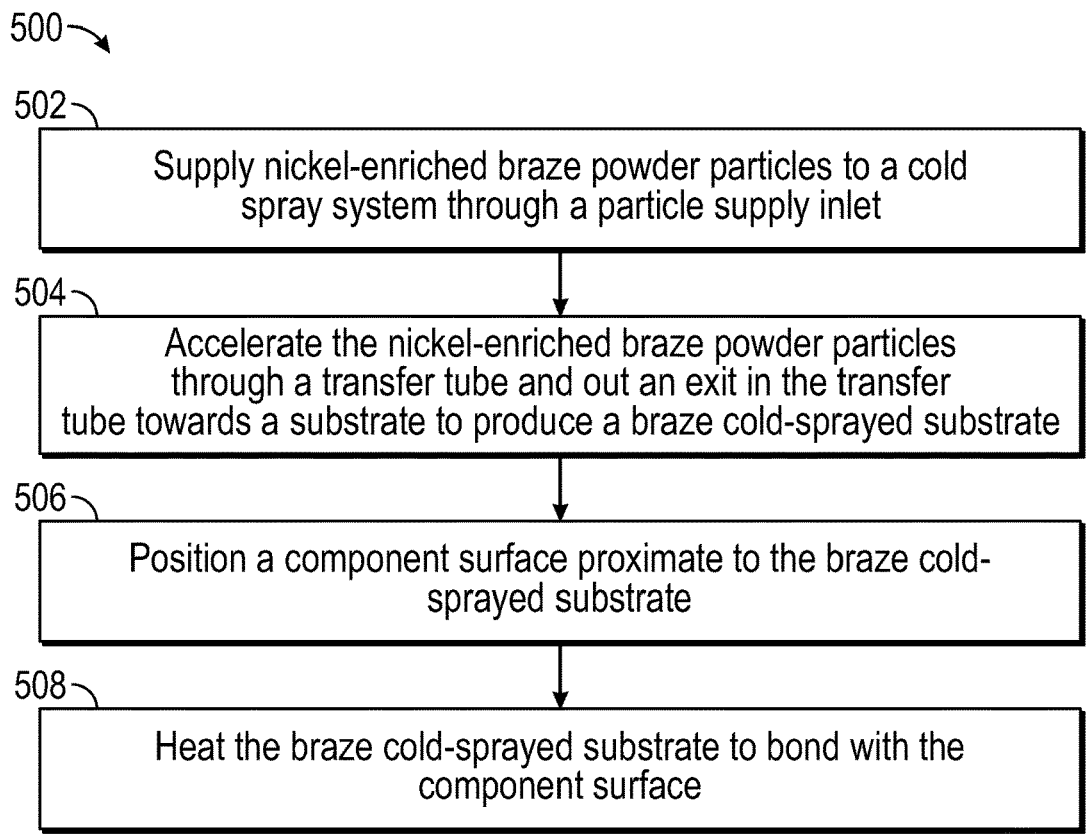
FIG. 5 is a process flow of a method in accordance with an embodiment of the disclosure.

FIG. 5 depicts a process 500 for cold-spray braze material deposition and is described in reference to FIGS. 1-5. At block 502, a plurality of nickel-enriched braze powder particles 122 is supplied to a cold spray system 101 in a carrier flow 124 through a particle supply inlet 120 responsive to a controller 102. At block 504, the nickel-enriched braze powder particles 122 are accelerated through a transfer tube 162 and out an exit 164 in the transfer tube 162 towards a substrate 20 to produce a braze cold-sprayed substrate 300 responsive to the controller 102. At block 606, a component surface 404 can be positioned proximate to the braze cold-sprayed substrate 300. At block 608, the braze cold-sprayed substrate 300 can be heated to bond the braze cold-sprayed substrate 300 to the component surface 404, for instance, using the heating system 190.

A hole 402 can be formed in the braze cold-sprayed substrate 300, and the component surface 404 can be positioned within the hole 402, such as the component surface 404 of a tube 204. The process can be repeated to assemble an apparatus 200, such as a tube-shell heat exchanger as depicted in FIG. 2. Holes 402 can be formed by drilling, punching, boring, laser cutting, and/or other such operations. In some embodiments, all of the holes 402 are formed prior to positioning the component surfaces 404 within corresponding holes 402. In other embodiments, positioning the component surfaces 404 within corresponding holes 402 can begin prior to forming all of the holes 402 (see, for example, location 406 of FIG. 4 where a hole 402 has not yet been formed). In some embodiments, cold spraying is performed on multiple surfaces 206 of the substrate 20 of the manifold 202, holes 402 are formed in each cold-sprayed surface 206 of the braze cold-sprayed substrate 300 of the manifold 202, and a tube end 405 of tube 204 is positioned in each of the holes 402 prior to heating. A plurality of target locations 302 of the holes 402 can be determined prior to forming the holes 402, and the cold spraying can be limited to localized areas proximate to the target locations 302.

Figure 6:
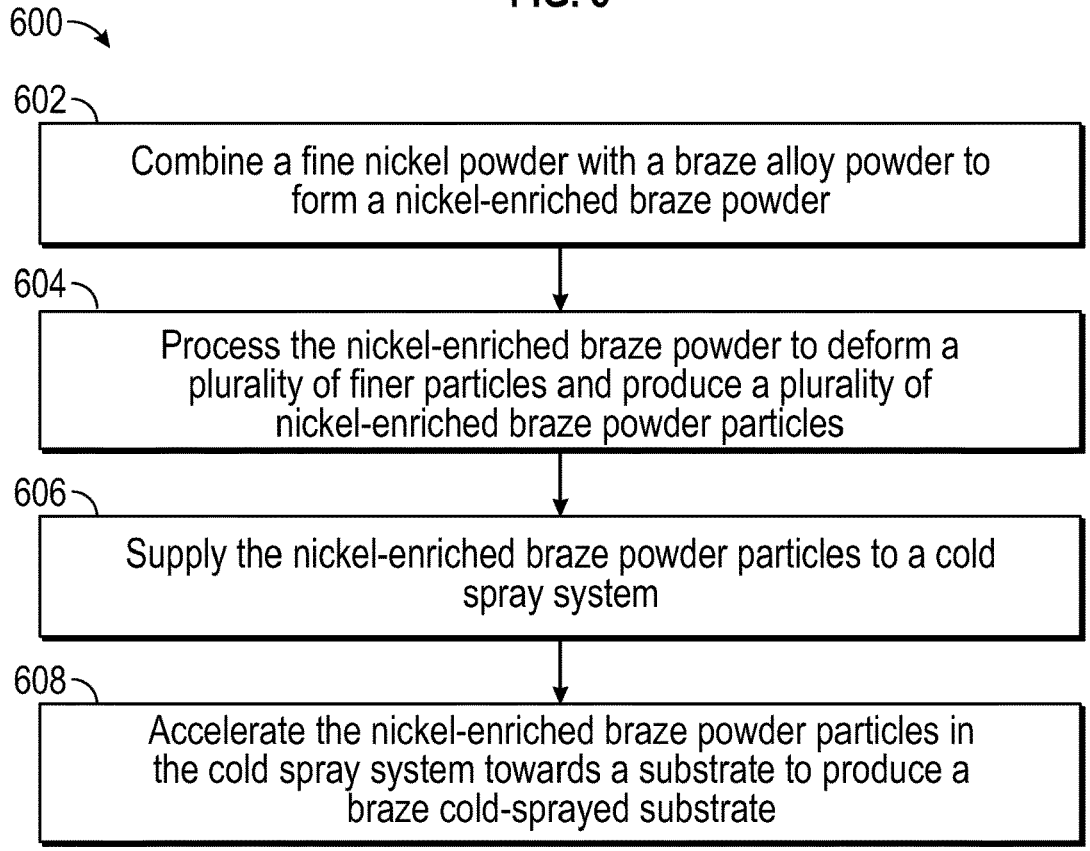
FIG. 6 is a process flow of a method in accordance with an embodiment of the disclosure.

FIG. 6 depicts a process 600 for cold-spray braze material deposition and is described in reference to FIGS. 1-6. The process 600 can be an extension, a modification, or an alternate to process 500 of FIG. 5

At block 602, a fine nickel powder 128 is combined with a braze alloy powder 126 to form a nickel-enriched braze powder. At block 604, the nickel-enriched braze powder is processed to deform a plurality of finer particles and produce a plurality of nickel-enriched braze powder particles 122. Processing of the nickel-enriched braze powder can include mixing the nickel-enriched braze powder with an acid and a polymer for a desire particle size distribution and to reduce a risk of clogging within the system 100. In some embodiments, a magnetic field can be applied to the braze alloy powder 126 to remove a quantity of nickel from the braze alloy powder 126 prior to combining the fine nickel powder 128 with the braze alloy powder 126.

At block 606, the nickel-enriched braze powder particles 122 are supplied to a cold spray system 101. At block 608, the nickel-enriched braze powder particles 122 are accelerated in the cold spray system 101 towards a substrate 20 to produce a braze cold-sprayed substrate 300. The controller 102 can control velocity of a gas stream 142 used to accelerate the nickel-enriched braze powder particles 122. The controller 102 can also control a temperature of one or more of: the nickel-enriched braze powder particles 122 and the gas stream 142. Further, the controller 102 can control one or more of: a position of the substrate 20 and a position of a spray nozzle (e.g., exit 164) operable to accelerate the nickel-enriched braze powder particles 122 towards the substrate 20. The cold spray system 101 may also support recapturing a volume of gas from the gas stream 142 within an enclosure 168 using the gas reclamation system 170.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method comprising:
supplying a plurality of nickel-enriched braze powder particles to a cold spray system through a particle supply inlet;
accelerating the nickel-enriched braze powder particles through a transfer tube and out an exit in the transfer tube towards a substrate to produce a braze cold-sprayed substrate;
forming a hole in the braze cold-sprayed substrate;
positioning a component surface proximate to the braze cold-sprayed substrate and within the hole; and
heating the braze cold-sprayed substrate to bond the braze cold-sprayed substrate to the component surface.

2. The method of claim 1, wherein the nickel-enriched braze powder particles comprises a braze alloy powder combined with a nickel powder.

3. The method of claim 1, wherein the substrate comprises a nickel-based alloy.

4. The method of claim 1, wherein the braze cold-sprayed substrate comprises a manifold of a tube-shell heat exchanger and the component surface comprises an exterior of a tube.

5. The method of claim 4, further comprising:
cold spraying a plurality of surfaces of the substrate;
forming a plurality of holes in each cold-sprayed surface of the braze cold-sprayed substrate of the manifold; and
positioning a tube end in each of the holes prior to heating.

6. The method of claim 5, further comprising:
determining a plurality of target locations of the holes prior to forming the holes; and
limiting the cold spraying to localized areas proximate to the target locations.

7. A method comprising:
applying a magnetic field to a braze alloy powder to remove a quantity of nickel from the braze alloy powder;
combining a nickel powder with the braze alloy powder to form a nickel-enriched braze powder;
processing the nickel-enriched braze powder to deform a plurality of finer particles and produce a plurality of nickel-enriched braze powder particles;
supplying the nickel-enriched braze powder particles to a cold spray system; and
accelerating the nickel-enriched braze powder particles in the cold spray system towards a substrate to produce a braze cold-sprayed substrate.

8. The method of claim 7, wherein the substrate comprises a nickel-based alloy.

9. The method of claim 7, wherein processing the nickel-enriched braze powder comprises mixing the nickel-enriched braze powder with an acid and a polymer.

10. The method of claim 7, further comprising:
controlling a velocity of a gas stream used to accelerate the nickel-enriched braze powder particles.

11. The method of claim 10, further comprising:
controlling a temperature of one or more of: the nickel-enriched braze powder particles and the gas stream.

12. The method of claim 11, further comprising:
controlling one or more of: a position of the substrate and a position of a spray nozzle operable to accelerate the nickel-enriched braze powder particles towards the substrate.

13. The method of claim 11, wherein the cold spray system comprises an enclosure and the method further comprises:
recapturing a volume of gas from the gas stream within the enclosure.

* * * * *